(12) United States Patent
Katz et al.

(10) Patent No.: US 6,200,704 B1
(45) Date of Patent: Mar. 13, 2001

(54) HIGH CAPACITY/HIGH DISCHARGE RATE RECHARGEABLE POSITIVE ELECTRODE

(75) Inventors: Bruce D. Katz, Berkeley; Lutgard C. De Jonghe, Lafayette; May-Ying Chu, Oakland; Steven J. Visco, Berkeley, all of CA (US)

(73) Assignee: Polyplus Battery Company, Inc., Berkeley, CA (US)

( * ) Notice: Subject to any disclaimer, the term of this patent is extended or adjusted under 35 U.S.C. 154(b) by 0 days.

(21) Appl. No.: 09/145,484

(22) Filed: Sep. 1, 1998

(51) Int. Cl.$^7$ ...................................................... H01M 4/58
(52) U.S. Cl. ...................... 429/218.1; 429/227; 429/221; 429/231.5; 429/231.95
(58) Field of Search .................................. 429/218.1, 221, 429/227, 231.5, 231.95

(56) References Cited

U.S. PATENT DOCUMENTS

| | | | |
|---|---|---|---|
| 3,404,035 | 10/1968 | Kummer et al. | 136/6 |
| 3,413,150 | 11/1968 | Kummer et al. | 136/6 |

(List continued on next page.)

FOREIGN PATENT DOCUMENTS

| | | |
|---|---|---|
| 0602984A2 | 6/1994 | (EP) . |
| 2 273 603 | 10/1984 | (GB) . |

(List continued on next page.)

OTHER PUBLICATIONS

Abstract of proceedings of the 6th International Symposium on Power Sources 2, 1968, Brighton, Sussex, UK, Sep. 24–26, 1968.

Coleman et al., "The Sulfur Electrode" proceedings of the 6th International Symposium on Power sources, pp. 289–302 (1968).

(List continued on next page.)

*Primary Examiner*—Stephen Kalafut
*Assistant Examiner*—Angela J. Martin
(74) *Attorney, Agent, or Firm*—Beyer Weaver & Thomas, LLP (57) ABSTRACT

Disclosed is a positive electrode that has a low equivalent weight and high cell voltage and consequently a high specific energy, and a high discharge rate pulse capability. Also disclosed are methods for fabricating active-sulfur-based composite electrodes, and battery cells incorporating such electrodes.

The batteries of this invention are preferably rechargeable and operate at high sulfur utilization over many cycles. Positive electrodes according to the present invention are composed of at least two electrochemically active materials: an "active-sulfur" material, and a second electrochemically active material having a higher discharge rate than the active-sulfur component. The active-sulfur component is also oxidizing with respect to the higher discharge rate material. In operation, the active-sulfur component of the positive electrode discharges to satisfy power demands below its maximum discharge rate. The high discharge rate (but relatively low capacity) material is discharged to satisfy power demands that exceed the active-sulfur's discharge rate. The high discharge rate material in the positive electrode may be effectively recharged (or "regenerated") chemically by oxidation by the active-sulfur material during a "resting" phase, that is, when the power demands on a battery cell in which the cathode is incorporated are low enough that they may be met without exceeding the maximum discharge rate of the active-sulfur component of the positive electrode.

29 Claims, 3 Drawing Sheets

U.S. PATENT DOCUMENTS

| | | | |
|---|---|---|---|
| 3,532,543 | 10/1970 | Nole et al. | 136/6 |
| 3,907,591 | 9/1975 | Lauck | 136/6 |
| 3,915,743 | 10/1975 | Lauck | 136/6 |
| 3,953,231 | 4/1976 | Farrington et al. | 136/6 |
| 4,143,214 | 3/1979 | Chang . | |
| 4,268,587 | 5/1981 | Farrington et al. . | |
| 4,410,609 | 10/1983 | Peled et al. | 429/105 |
| 4,469,761 | 9/1984 | Bennett et al. | 429/50 |
| 4,644,991 | 2/1987 | Perichaud et al. . | |
| 4,833,048 | 5/1989 | Dejonghe et al. | 429/104 |
| 4,917,974 | 4/1990 | De Jonghe et al. | 429/104 |
| 5,162,175 | 11/1992 | Visco et al. | 429/192 |
| 5,523,179 | 6/1996 | Chu . | |
| 5,529,860 | 6/1996 | Skotheim et al. . | |
| 5,532,077 | 7/1996 | Chu . | |
| 5,582,623 | 12/1996 | Chu . | |
| 5,686,201 | 11/1997 | Chu . | |
| 5,814,420 * | 9/1998 | Chu | 429/104 |

FOREIGN PATENT DOCUMENTS

| | | | |
|---|---|---|---|
| 2137406 * | 10/1984 | (GB) | H01M/4/58 |
| 2 137406 | 6/1994 | (GB) . | |
| 6-275313 | 9/1994 | (JP) | H01M/10/36 |

OTHER PUBLICATIONS

Visco, S.J., Liu, M., Armand, B. and De Jonghe, L.C., Solid Redox Polymerization Electrodes and Their use in All–Solid–State Batteries, Mol. Cryst. Liq. Cryst., 190, p. 198, 1990.

Societe des Accumulateurs Fixes et de Traction, "Lithium–sulfur battery" Abstracts 111055d, Chemical Abstracts 66:10360; 1967.

DeGott, P., "Polymere Carbone–Soufre Synthese Et Proprietes Electrochimiques," Doctoral Thesis at l'Institut National Polytechnique de Grenoble, (Date of Defense Jun. 19, 1986).

Lauck, H., "Storage battery with lithium anode and sulfur cathode," Abstract # 9855s, Chemical Abstracts, 80:467–468; 1974.

Peled et al., Rechargeable Lithium–Sulfur Battery (Extended Abstact), Journal of Power Source, 26:269–271, 1989.

Peled et al.; "Lithium–Sulfur Battery: Evaluation of Dioxolane–Based Electrolytes", J. Electrochem., Soc., 136(6):1621–1624, Jun. 1989.

Peramunage and Licht, "A Solid Sulfur Cathode for Aqueous Batteries"; Science 261:1029–1032, Aug. 20, 1993.

Rauh et al., "Formation of Lithium Polysulfides in Aprotic Media", J. Inorg., Nuc. Chem., 39:1761–1765, 1977.

Rauh et al. "A Lithium/Dissolved Sulfur Battery with an Organic Electrolyte"; J. Electrochem. Soc., 126(4):523–527, Apr. 1979.

Yamin and Peled, "Electrochemistry of Nonaqueous Lithium/Sulfur Cell", J. Power Sources, 9:281–287, 1983.

Yamin et al., Lithium Sulfur Battery,: J. Electrochem. Soc., 135(5): 1045–1048, May 1988.

S.J. Visco, M.M. Doeff, and L.C. De Jonghe, "Thin–Film Technology for Solid–State Lithium Batteries Employing Solid Redox Poly–Merization Cathodes", pp. 89–92, Society of Vacuum Coaters, 1991.

Liu, Meilin, Visco, Steven J., and De Jonghe, Lutgard C., "Novel Solid Redox Polymerization Electrodes Electrochemical Properties", J. Electrochem Soc., vol. 138, No. 7, pp. 1896–1901, Jul. 1991.

Liu, Meilin, Visco, Steven J., and De Jonghe, Lutgard C., "Novel Solid Redox Polymerization Electrodes All–Solid State, Thin–Film, Rechargeable Lithium Batteries", J. Electrochem Soc., vol. 138, No. 7, pp. 1891–1895, Jul. 1991.

Ue, Makoto, Visco, Steven J., and De Jonghe, Lutgard C., "Comparison of Cathode Utilization between Polymeric Organodisulfide and Titanium Disulfide in Solid Polymer Electrode Rechargeable Lithium Cells", Denki Kagaku, vol. 61, No. 12, pp. 1409–1415, 1993.

Meilin, Lui, "Novel Electrodes for Advanced Energy Storage System" Dissertation for Ph.D. at the University of Berkeley, Chapter 2, pp. 3–6, 1989.

J.R. Coleman, et al., "The Sulfur Electrode", (1968) 289–302, Defense Chemical Biological and Radiation Establishment, Defense Research Board, Ottawa, Canada.

R.D. Rauh, et al. "Rechargeability Studies of Ambient Temperature Lithium/Sulfur Batteries", 12th IECEC, 283–287 (1977).

S.B. Brummer, et al. "Low Temperature Lithium/Sulfur Secondary Battery", U.S. Energy Research and Development Administration Div. of Electric Energy Systems, 1–57 (1976).

A. Gavrilov, et al. "In Situ Morphological Study of Lithium–Electrolyte Interface", Electrochemical Society, (Extended Abstract).

Kavan, L., Novak, P., and Dousek, F.P., "Electrochimica Acto," vol. 33, No. 11, pp. 1605–1612, Mar. 8, 1988, Great Britain.

Larry A. Dominey, "Lithium Batteries" New Materials, Developments and Perspectives, 1994, New York, Industrial Chemistry Library, vol. 5, pp. 137–165.

Ronald Snaith, et al., "Lithium Chemistry" A Theoretical and Experimental Overview, 1995, New York, John Wiley & Sons, Inc., pp. 227–477.

Makota et al. "Comparison of Cathode Utilization Between Polymeric Organodisulfide and Titanium Disulfide in Solid Polymer Electrode Rechargeable Lithium Cells," Denki Kagaku, vol. 61, No. 12, pp. 1409–1416, 1993.*

* cited by examiner

Schematic of Li/electrolyte separator/active - sulfur electrode cell

FIG. 3

HIGH CAPACITY/HIGH DISCHARGE RATE RECHARGEABLE POSITIVE ELECTRODE

BACKGROUND OF THE INVENTION

This invention relates generally to positive electrodes characterized by active-sulfur and a second material having a higher discharge rate than active-sulfur. The electrodes are preferably rechargeable, and in some preferred embodiments as a thin-film format. Various negative electrodes, such as, alkali metal, alkaline earth metal, transition metal, and carbon insertion electrodes, among others, can be coupled with the positive electrode to provide battery cells, preferably having high specific energy (Wh/kg) and energy density (Wh/l), while providing high rate pulse capability. All references cited in this application are incorporated by reference for all purposes.

The rapid proliferation of portable electronic devices in the international marketplace has led to a corresponding increase in the demand for advanced secondary batteries. The miniaturization of such devices as, for example, cellular phones, laptop computers, etc., has naturally fueled the desire for rechargeable batteries having high specific energies (light weight). At the same time, mounting concerns regarding the environmental impact of throwaway technologies, has caused a discernible shift away from primary batteries and toward rechargeable systems.

In addition, heightened awareness concerning toxic waste has motivated, in part, efforts to replace toxic cadmium electrodes in nickel/cadmium batteries with the more benign hydrogen storage electrodes in nickel/metal hydride cells. For the above reasons, there is a strong market potential for environmentally benign secondary battery technologies.

Secondary batteries are in widespread use in modern society, particularly in applications where large amounts of energy are not required. However, it is desirable to use batteries in applications requiring considerable power, and much effort has been expended in developing batteries suitable for high specific energy, medium power applications, such as, for electric vehicles and load leveling. Of course, such batteries are also suitable for use in lower power applications such as cameras or portable recording devices.

At this time, the most common secondary batteries are probably the lead-acid batteries used in automobiles. Those batteries have the advantage of being capable of operating for many charge cycles without significant loss of performance. However, such batteries have a low energy to weight ratio. Similar limitations are found in most other systems, such as Ni—Cd and nickel metal hydride systems.

Among the factors leading to the successful development of high specific energy batteries, is the fundamental need for high cell voltage and low equivalent weight electrode materials. Electrode materials must also fulfill the basic electrochemical requirements of sufficient electronic and ionic conductivity, high reversibility of the oxidation/reduction reaction, as well as excellent thermal and chemical stability within the temperature range for a particular application. Importantly, the electrode materials must be reasonably inexpensive, widely available, non-toxic, and easy to process.

Thus, a smaller, lighter, cheaper, non-toxic battery has been sought for the next generation of batteries. The low equivalent weight of lithium renders it attractive as a battery electrode component for improving weight ratios. Lithium provides also greater energy per volume than do the traditional battery standards, nickel and cadmium.

The low equivalent weight and low cost of sulfur and its nontoxicity renders it also an attractive candidate battery component. Successful lithium/organosulfur battery cells are known. (See, De Jonghe et al., U.S. Pat. Nos. 4,833,048 and 4,917,974; and Visco et al., U.S. Pat. No. 5,162,175.)

Recent developments in ambient-temperature sulfur electrode technology may provide commercially viable rechargeable lithium-sulfur batteries. Chu and colleagues are largely responsible for these developments which are described in U.S. Pat. Nos. 5,582,623 and 5,523,179 (issued to Chu). The patents disclose an sulfur-based positive electrode for a battery cell that has low equivalent weight and high cell voltage and consequently a high specific energy (greater than about 120 Wh/kg). The disclosed positive electrode addresses deficiencies in the prior art to provide a high capacity sulfur-based positive composite electrode suitable for use with metal (such as lithium) negative electrodes in secondary battery cells. These developments allow electrochemical utilization of elemental sulfur at levels of 50% and higher over multiple cycles. Because sulfur has a theoretical maximum capacity of 1675 mAh/g (assuming all sulfur atoms in an electrode are fully reduced during discharge), the utilization of sulfur in lithium-sulfur cells as described in the above Chu patents typically exceeds 800 milliamp-hours per gram (mAh/g) of sulfur.

The sulfur-based positive electrodes described in the above Chu patents provide increased capacity over previously available electrodes. Of course, further increases in electrode (and hence battery) capacity would be desirable. In addition, another desirable characteristic of a battery cell for some applications is fast kinetics, that is, the ability to adequately respond to high power requirements with a high discharge rate. Some portable electronic devices, for example, have a variety of different power requirements. For example, a camera battery must be able to respond to relatively low power requirements associated with such general operations as shutter activation, auto focus, zoom lens adjustment, and film advancement and rewind. In addition, the camera battery must be able to respond to such relatively infrequent and short-lived high power requirements as flash operation. For such devices, a battery which combines the features of increased capacity and high discharge rate pulse capability may be optimal.

Accordingly, cathodes and battery cells having both high capacity and high discharge rate pulse characteristics would be desirable. A rechargeable (secondary) electrode/battery having such features would be further desirable.

SUMMARY OF THE INVENTION

The present invention provides a positive electrode for a battery cell that has low equivalent weight and high cell voltage and consequently a high specific energy, and has high discharge rate pulse capability. The batteries of this invention are preferably rechargeable and operate at high sulfur utilization over many cycles. Positive electrodes according to the present invention are composed of at least two electrochemically active materials: an "active-sulfur" material, and a second electrochemically active material having a higher discharge rate than the active-sulfur component. The active-sulfur component is also oxidizing with respect to the higher discharge rate material. In operation, the active-sulfur component of the positive electrode discharges to satisfy power demands below its maximum discharge rate. The high discharge rate (but relatively low capacity) material is discharged to satisfy power demands that exceed the active-sulfur's discharge rate. The high discharge rate material in the positive electrode may be effectively recharged (or "regenerated") chemically by oxidation by the active-sulfur material during a "resting" phase, that is, when the power demands on a battery cell in which the cathode is incorporated are low enough that they may be met without exceeding the maximum discharge rate of the active-sulfur component of the positive electrode. This effective recharge occurs according to a well known electrochemical mechanism due to the contact between the two electrochemically active materials in the positive electrode, and the fact that the active-sulfur material is oxidizing with respect to the higher discharge rate material.

Thus the high capacity of the active-sulfur component of the positive electrode may be leveraged to chemically regenerate the lower capacity but higher discharge rate material so that both materials are available for discharge until the active-sulfur component is exhausted. This feature of the present invention may be used to provide increased capacity primary battery cells, or the active-sulfur component of the positive electrode may be electrically recharged according to well known methods described, for example, in the above-referenced Chu patents, and the battery cell may be reused and similarly recycled as a secondary cell.

Exemplary higher discharge rate electrochemically active materials in accordance with preferred embodiments of the present invention include iron sulfide ($FeS_2$) and titanium sulfide ($TiS_2$). Certain conductive polymers may also be used. The materials should be selected so that they are readily oxidized by active-sulfur.

In one aspect, the present invention provides a positive electrode. The positive electrode includes a first electrochemically active material selected from elemental sulfur, a metal sulfide, a metal polysulfide, and combinations thereof, wherein the metal is selected from alkali metals, alkaline earth metals, and mixtures of alkali and alkaline earth metals; and a second electrochemically active material, having a higher discharge rate than the first electrochemically active material, and having a discharge material that is oxidizable by a redox reaction with a polysulfide species. Positive electrodes in accordance with the present invention may also include an electronically conductive material mixed with the electrochemically active materials so that electrons move between the electrochemically active materials and the electronically conductive material; and an ionically conductive material mixed with the electrochemically active materials so that ions move between the ionically conductive material and the electrochemically active materials.

In another aspect, the present invention provides a battery cell. The battery cell includes a positive electrode having a mixture of a first electrochemically active material selected from elemental sulfur, a metal sulfide, a metal polysulfide, and combinations thereof, wherein the metal is selected from alkali metals, alkaline earth metals, and mixtures of alkali and alkaline earth metals; and a second electrochemically active material, having a higher discharge rate than the first electrochemically active material, and having a discharge material that is oxidizable by a redox reaction with a polysulfide species. The battery cell also includes a current collector electrically connected to the positive electrode, a negative electrode including a metal or metal ion (preferably lithium), and an electrolyte separator.

These and other features of the invention will further described and exemplified in the drawings and detailed description below.

DETAILED DESCRIPTION OF THE PREFERRED EMBODIMENTS

Reference will now be made in detail to preferred embodiments of the invention. Examples of the preferred embodiments are illustrated in the accompanying drawings. While the invention will be described in conjunction with these preferred embodiments, it will be understood that it is not intended to limit the invention to such preferred embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

This invention provides positive electrodes for battery cells that have low equivalent weight and high cell voltage and consequently high specific energy, and high discharge rate pulse capability. The batteries of this invention are preferably rechargeable and operate at high sulfur utilization over many cycles. The batteries are preferably constructed in a thin film format such that the current density does not become diffusion limited.

Positive electrodes according to the present invention are composed of at least two electrochemically active materials: an "active-sulfur" material, and a second electrochemically active material having a higher discharge rate than the active-sulfur component. The active-sulfur component is also oxidizing with respect to the higher discharge rate material. In operation, the active-sulfur component of the positive electrode discharges to satisfy power demands below its maximum discharge rate. The high discharge rate (but low capacity) material is discharged to satisfy power demands that exceed the active-sulfur's discharge rate. The high discharge rate material in the positive electrode may be effectively recharged (or "regenerated") chemically by oxidation by the active-sulfur material during a "resting" phase, that is, when the power demands on a battery cell in which the cathode is incorporated are low enough that they may be met without exceeding the maximum discharge rate of the active-sulfur component of the positive electrode. This effective recharge occurs according to a well known electrochemical mechanism due to the contact between the two electrochemically active materials in the positive electrode, and the fact that the active-sulfur material is oxidizing with respect to the higher discharge rate material.

Thus the high capacity of the active-sulfur component of the positive electrode may be leveraged to chemically regenerate the lower capacity but higher discharge rate material so that both materials are available for discharge until the active-sulfur component is exhausted. This feature of the present invention may be used to provide increased capacity primary battery cells, or the active-sulfur component of the positive electrode may be electrically recharged according to well known methods described, for example, in the above-referenced Chu patents, and the battery cell may be reused and similarly recycled as a secondary cell.

The positive electrodes of the present invention may be fabricated by adaptation of conventional methods and combined with negative electrodes and electrolytes to form battery cells in accordance with the present invention. These features, together with the operation and advantages of the positive electrodes and battery cells of the present invention are described in more detail below.

Positive Electrodes

The positive electrode must utilize at least one electrochemically active material capable of being reduced during discharge by reaction with metal or metals found in the negative electrode. In this invention, the positive electrode contains an electrochemically active material that includes some substantial fraction of "sulfur." Sometimes the sulfur-based electroactive material in a positive electrode in accordance with the present invention may be generally referred to as "active-sulfur." As used herein, that term refers to electroactive material that is elemental sulfur or discharge products of elemental sulfur that would return to elemental sulfur in a theoretically fully-charged state.

The positive electrodes of this invention are composites which include a first high capacity electrochemically active component in the form of an active-sulfur material, as discussed above, and a second high discharge rate electrochemically active material having a discharge material that is oxidizable by a polysulfide redox reaction, such as a metal sulfide, for example iron sulfide ($FeS_2$). The electrodes include in their theoretically fully-charged (fully-oxidized) state: sulfur, and a second electrochemically active material having a higher discharge rate that sulfur, such as $FeS_2$. At some state of discharge, the positive electrode will include one or more of sulfides and polysulfides, which are sulfides and polysulfides generated by reaction of the sulfur of the positive electrode with the metal or metals found in the negative electrode. In some embodiments, the fully-charged electrode may also include some amount of such sulfides and/or polysulfides.

Upon discharge, the sulfur of the positive electrode reacts with the metal of the negative electrode to form the metal sulfides and polysulfides. For example, where M is the metal of the negative electrode, the reaction of the active-sulfur component of the positive electrode can be described as follows:

$$x/z\ M+S=M_{x/z}S$$

where M is any metal that can function as an active component in a negative electrode in a battery cell in which sulfur is an active component of the positive electrode; x=0 through x=2; z=the valence of the metal; and S is sulfur.

M is preferably at least one of an alkali metal, an alkaline earth metal, and a transition metals. M is more preferably selected an alkali metal, and still more preferably lithium or sodium. M is most preferably lithium.

In a preferred embodiment of this invention where the negative electrode contains lithium, the overall cell reaction wherein z=1 can be described as follows:

$$xLi+S=Li_xS.$$

When x=2, 100% of the theoretical specific energy of the system has been released. If all elemental sulfur in the positive electrode reacts completely (so that all sulfur resides in $Li_2S$), the sulfur in the electrode is 100% utilized so that all 1675 mAh/g of sulfur is extracted during discharge.

Additional details concerning electrochemical and chemical mechanisms of lithium-sulfur battery cells, particularly they relate to liquid electrolyte battery systems, are described in U.S. patent application Ser. No. 08/948,969, incorporated by reference herein in its entirety.

The second electrochemically active material of the positive electrode has less capacity but is more electronically conductive, and thus is capable of more rapid discharge than the active-sulfur material, and is oxidizable by a redox reaction with a polysulfide species. This second material may replace some of the electronically conductive material, such a carbon (which does not provide any capacity), thus adding capacity to the electrode. It has a higher discharge rate than the active-sulfur, and a voltage profile which drops below that of the active-sulfur during discharge of a battery cell incorporating the positive electrode. Preferably, the voltage profile of the second material is close to (i.e., within about 0.5 V) that of the active-sulfur and is always below or drops below that of the active-sulfur early in discharge. Most preferably, the voltage profile of the second material substantially parallels that of the active-sulfur and is just below it. The second material may be, for example, a metal sulfide or oxide (such as iron sulfide ($FeS_2$), titanium sulfide ($TiS_2$), molybdenum sulfide ($MoS_2$), or manganese oxide ($MnO_2$)), or a conductive polymer which has a higher discharge rate than active-sulfur and is oxidized by a redox reaction with a polysulfide species, such as described in more detail below.

Discharge products of these high discharge rate materials include metal intercalation compounds with the materials. For example, the reaction of the high discharge rate material $FeS_2$ can be described as follows:

$$FeS_2+Li=LiFeS_2$$

Further reduction of the iron sulfide may result in displacement, as follows:

$$LiFeS_2+Li=Fe+2\ Li_2S.$$

A particularly advantageous feature of positive electrodes in accordance with the present invention is their combination of high capacity and high discharge rate pulse capability in a secondary battery. The invention also improves upon primary battery cells. The operation of battery cells in accordance with preferred embodiments of the present invention will now be described with reference to particularly preferred embodiments in which the two electrochemically active components of the positive electrode are the active-sulfur compound $Li_2S_8$ and the high discharge rate material is iron sulfide ($FeS_2$) or titanium sulfide ($TiS_2$).

Figure 1A:
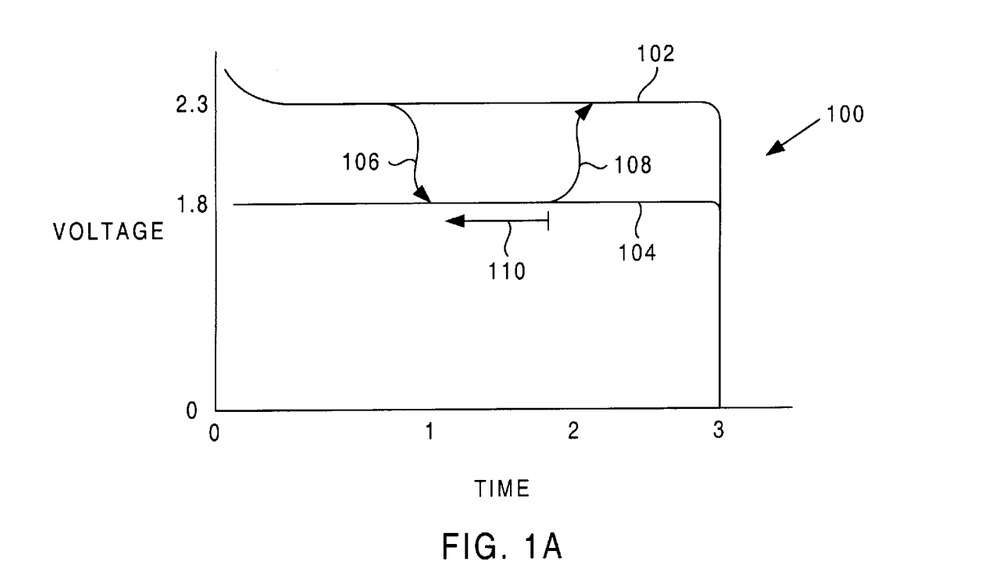
FIGS. 1A and 1B are plots of voltage vs. time illustrating discharge profiles for positive electrodes of battery cells in accordance with two preferred embodiments of the present invention.

Referring to FIG. 1A, a plot 100 of voltage vs. time illustrating the discharge profiles of the two electrochemically active components $Li_2S_8$ 102 and $FeS_2$ 104 of a positive electrode of a battery cell in accordance with a preferred embodiment of the present invention is illustrated. The $Li_2S_8$ has a substantially flat discharge profile at about 2.3 V. The $FeS_2$ also has a substantially flat discharge profile at about 1.8 V. At time 0, the battery begins to provide power. The $Li_2S_8$ component of the positive electrode begins to discharge first, since is has the higher voltage profile. In this example, the base power requirement of the battery may be met without exceeding the maximum discharge rate of the $Li_2S_8$.

At time 1, the power requirement is increased such that the maximum discharge rate of the $Li_2S_8$ is exceeded. At this point, the voltage drops until the 1.8 V of the $FeS_2$ profile is met, as illustrated by arrow 106. The $FeS_2$ is then able to discharge at a rate sufficient to satisfy the higher power demand. In many battery applications, such an increased power demand is temporary and may be satisfied by a pulse of high rate discharge. An example of such an application is a camera battery. For shutter and film advancement operations, high discharge rate is not necessary and the high capacity of active-sulfur is preferred for longer battery life. However, flash photography periodically requires the high discharge rate pulse capability of the FeS$_2$. Both of these requirements are satisfied by the combination of electrochemically active materials in the positive electrodes of this embodiment of the present invention.

Following the high discharge rate event, at time 2, the battery's discharge voltage returns to 2.3 V, as illustrated by arrow 108, and the active-sulfur continues to discharge. Time 2 also commences a "resting" phase for the FeS$_2$ component of the positive electrode. During the resting phase, the FeS$_2$ is not being electrically discharged, and therefore the chemical interaction between the Li$_2$S$_8$ and the FeS$_2$ may dominate to oxidize the FeS$_2$ discharge product LiFeS$_2$ back into FeS$_2$ and polysulfide, as represented by arrow 110 in FIG. 1A, and as follows:

for example:

In this way, the high discharge rate material is regenerated so that it is ready to provide another high discharge rate pulse when needed.

At time 3, both the Li$_2$S$_8$ and the FeS$_2$ have been completely discharged, according to the electrochemistry described above. In the case of a primary cell, whose capacity was increased by combination of the high capacity Li$_2$S$_8$ with the more conventional primary cell material FeS$_2$ in the positive cathode, the cell is spent and may be replaced. However, it is a particular advantage of the present invention that batteries including positive electrodes in accordance with the present invention may also be rechargeable secondary cells. In secondary cell applications of the invention, the discharged cell may be electrically recharged in a conventional manner, such as is described by Chu et al., previously cited.

Figure 1B:
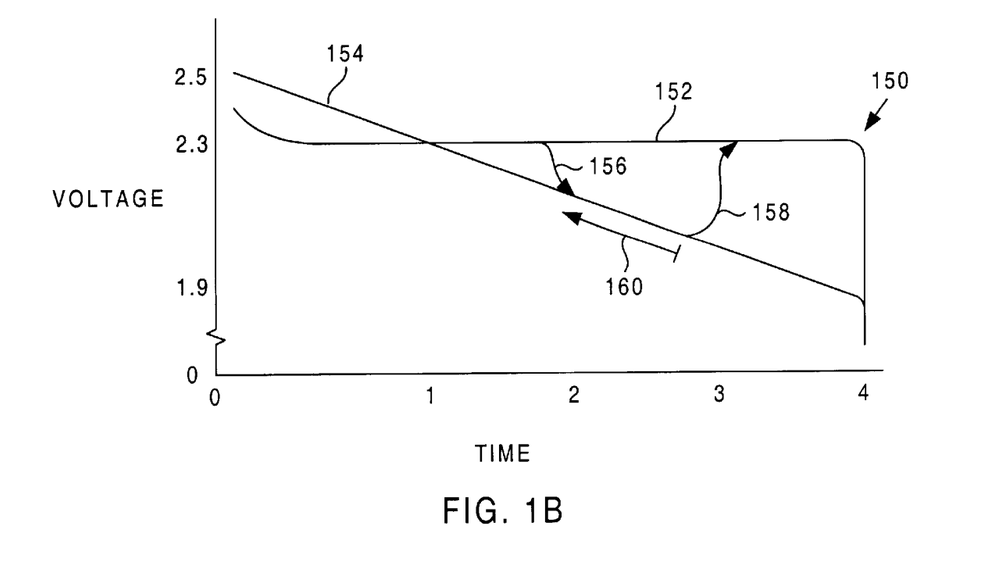

FIG. 1B illustrates a plot 150 of voltage vs. time illustrating the discharge profiles of the two electrochemically active components Li$_2$S$_8$ 152 and TiS$_2$ 154 of a positive electrode of a battery cell in accordance with a preferred embodiment of the present invention. The L$_2$S$_8$ has a substantially flat discharge profile at about 2.3 V. The TiS$_2$ also has a substantially downward sloping profile from about 2.5 V to about 1.9 V. At time 0, the battery begins to provide power. The TiS$_2$ component of the positive electrode begins to discharge first, since it has the higher voltage profile. However, since the TiS$_2$ component has a relatively low capacity and a sloping profile, the discharge voltage of the Li$_2$S$_8$ is soon reached, at time 1, and the Li$_2$S$_8$ component of the positive electrode begins to discharge to supply the power demand. As in the previous example, the power requirement of the battery may be met without exceeding the maximum discharge rate of the Li$_2$S$_8$.

At time 2, the power requirement is increased such that the maximum discharge rate of the Li$_2$S$_8$ is exceeded. At this point, the voltage drops until the voltage of the TiS$_2$ profile is met, as illustrated by arrow 156. The TiS$_2$ is then able to discharge at a rate sufficient to satisfy the higher power demand. Following the high discharge rate event, at time 3, the battery's discharge voltage returns to 2.3 V, as illustrated by arrow 158, and the active-sulfur continues to discharge. Time 2 also commences the resting phase for the TiS$_2$ component of the positive electrode, during which the LiTiS$_2$ discharge product of the high discharge rate reaction with the lithium of the negative electrode may be oxidized back into TiS$_2$ and lower polysulfides, as represented by arrow 160 in FIG. 1B, and the following reaction:

In this way, the high discharge rate material is regenerated so that it is ready to provide another high discharge rate pulse when needed. At time 4, both the Li$_2$S$_8$ and the TiS$_2$ have been completely discharged and may either be discarded (primary cell) or recharged (secondary cell), as described above.

From the above discussion, it should be apparent that upon discharge of the active-sulfur component the positive electrode becomes a combination of sulfur, metal sulfides and polysulfides, and during the discharging process the proportions of those sulfur-containing components will change according to the state of charge. The charge/discharge process in the positive electrode is reversible. Similarly, upon recharging, the percentages of the sulfur-containing ingredient will vary during the process.

The positive electrode is fabricated such that in operation it permits electrons to easily move between the sulfur and the electronically conductive material(s), and permits ions to move between the electrolyte and the sulfur. Thus, high sulfur utilization is realized after many cycles.

Solid phase sulfur positive electrodes of this invention preferably include an electronic conductor in intimate contact with the electrochemically active materials. In operation, the electrochemically active material must also be in intimate contact with an ion conductor. In the above referenced Chu patents, the ionic conductor typically was a separately added gel- or solid-state material present in the positive electrode. The present invention also includes liquid electrolyte batteries where the ionic conductor is preferably the electrolyte itself which permeates through the positive electrode and thereby remains in intimate contact with the active-sulfur.

Exemplary electronically conductive materials of the composite positive electrode include carbon black, graphite, carbon fibers, electronically conductive compounds with conjugated carbon-carbon and/or carbon-nitrogen double bonds, for example but not limited to, electronically conductive polymers, such as polyaniline, polythiophene, polyacetylene, polypyrrole, and combinations of such electronically conductive materials. The electronically conductive materials of the positive electrode may also have electrocatalytic activity. It should be noted that the high discharge rate electrochemical materials of the present invention may, in some embodiments, serve as the electronic conductor for the electrode. In this case, no separate electronic conductor would be required.

In preferred embodiments, the electronic conductor in the positive electrode preferably forms an interconnected matrix so that there is always a clear current path from the positive current collector to any position in the electronic conductor. This provides high availability of electroactive sites and maintained accessibility to charge carriers over repeated cycling. Often such electronic conductors will be fibrous materials such as a felt or paper. Examples of suitable materials include a carbon paper from Lydall Technical Papers Corporation of Rochester, N.H. and a graphite felt available from Electrosynthesis Company of Lancaster, N.Y.

The electrochemically active materials are preferably uniformly dispersed in a composite matrix containing an electronically conductive material. Preferred weight ratios of sulfur to electronic conductor in the positive electrodes of this invention in a fully-charged state are at most about 50:1, more preferably at most about 10:1, and most preferably at most about 5:1. The sulfur considered in these ratios includes both precipitated or solid phase sulfur as well as sulfur dissolved in an electrolyte. Preferably, the per weight ratio of electronic conductor to binder is at least about 1:1 and more preferably at least about 2:1.

The composite sulfur-based positive electrode may further optionally include performance enhancing additives such as binders, electrocatalysts (e.g., phthalocyanines, metallocenes, brilliant yellow (Reg. No. 3051-11-4 from Aldrich Catalog Handbook of Fine Chemicals; Aldrich Chemical Company, Inc., 1001 West Saint Paul Avenue, Milwaukee, Wis.) among other electrocatalysts), surfactants, dispersants (for example, to improve the homogeneity of the electrode's ingredients), and protective layer forming additives to protect a lithium negative electrode (e.g., organosulfur compounds, phosphates, iodides, iodine, metal sulfides, nitrides, and fluorides). Preferred binders (1) do not swell in the liquid electrolyte and (2) allow partial but not complete wetting of the sulfur by the liquid electrolyte. Examples of suitable binders include Kynar, available from Elf Atochem of Philadelphia, Pa., polytetrafluoroethylene dispersions, and polyethylene oxide (of about 900 k molecular weight for example). Other additives include electroactive organodisulfide compounds employing a disulfide bond in the compound's backbone. Electrochemical energy is generated by reversibly breaking the disulfide bonds in the compound's backbone. During charge, the disulfide bonds are reformed. Examples of organodisulfide compounds suitable for use with this invention are presented in U.S. Pat. Nos. 4,833,048 and 4,917,974 issued to DeJonghe et al. and U.S. Pat. No. 5,162,175 issued to Visco et al.

Upon discharge, the positive electrode becomes a combination of sulfur, metal sulfides and polysulfides, and during the discharging process the proportions of those sulfur-containing components will change according to the state of charge. The charge/discharge process in the positive electrode is reversible. Similarly, upon recharging, the percentages of the sulfur-containing ingredient will vary during the process.

In one preferred embodiment, the positive electrode is made from an electrode composition including at least two electrochemically active materials including active-sulfur and a second material having a higher discharge rate than the active-sulfur component. In alternative embodiments, the positive electrode may also include an electronically conductive material intermixed with the electrochemically active components in a manner that permits electrons to move between the electrochemically active components and the electronically conductive material. It may also include an ionically conductive material intermixed with the electrochemically active components in a manner that permits ions to move between the ionically conductive material and the electrochemically active components. In operation in a battery cell, all of these elements are preferably present in the positive electrode.

The ionically conductive material of said composite positive electrode may be in the liquid-, gel- or solid-state. When incorporated in a battery cell, the ionic conductor may be provided by a liquid electrolyte which permeates the positive electrode. The ionic conductor is preferably a polymeric electrolyte, more preferably a polyalkylene oxide, and further, preferably polyethylene oxide in which an appropriate salt may be added. Additional ionically conductive materials for use in the positive electrode include the components described below in the solid-state and gel-state electrolyte separator.

Preferred weight percentages of the major components of the active-sulfur-based composite positive electrodes in accordance with a preferred embodiment of this invention in a theoretically fully-charged state are: from about 20% to 95% active-sulfur, and from about 5% to 80% high discharge rate electrochemically active material. More preferably, those percentages are: from about 30% to 90% of active-sulfur, and from about 10% to 70% high discharge rate electrochemically active material. Even more preferable percentages are: from about 40% to 80% of active-sulfur, and from about 20% to 60% high discharge rate electrochemically active material. In embodiments where the positive electrode also includes one or both of an ionically conductive material and an electronically conductive material, those materials may be present in weight percentages of from about 5% to 70% of the ionically conductive material (which may be liquid-, gel- or solid-state), such as PEO with salt, and from about 0% to 40% of an electronically conductive material, such as carbon black.

The novel positive electrodes and battery cells of this invention may have a level of sulfur utilization comparable to that of active-sulfur batteries disclosed by Chu et al. in U.S. Pat. Nos. 5,523,179, 5,582,623, 5,686,201, 5,789,108 and U.S. patent application Ser. No. 09/103,651, incorporated herein by reference for all purposes. Thus, in a preferred embodiment, the invention provides a positive electrode for a battery cell that has low equivalent weight, high specific energy, and high discharge rate pulse capability.

Methods of Making a Positive Electrode

Positive electrodes in accordance with the present invention may be fabricated using techniques well known to those of skill in the art. A preferred method of making electrodes in accordance with this invention is illustrated in the flow chart of FIG. 2. It should be noted that positive electrodes in accordance with the present invention may be formulated with fewer than all of the components described below. For example, a positive electrode in accordance with the present invention may not contain a electronic conductor separate from the high discharge rate electrochemically active material, or it may not contain an ionic conductor prior to incorporation into a battery cell (particularly where the battery cell has a liquid electrolyte). Thus, the following description relates to but one preferred implementation of the present invention. An important feature of this implementation of the invention is the ability to provide electrodes having active material (active-sulfur (possibly including a polydisulfide polymer), and a high discharge rate electrochemically active material) in intimate contact with both an ionic conductor and an electronic conductor. This facilitates ion and electron transport to and from the active material to allow nearly complete utilization of the active material.

Figure 2:
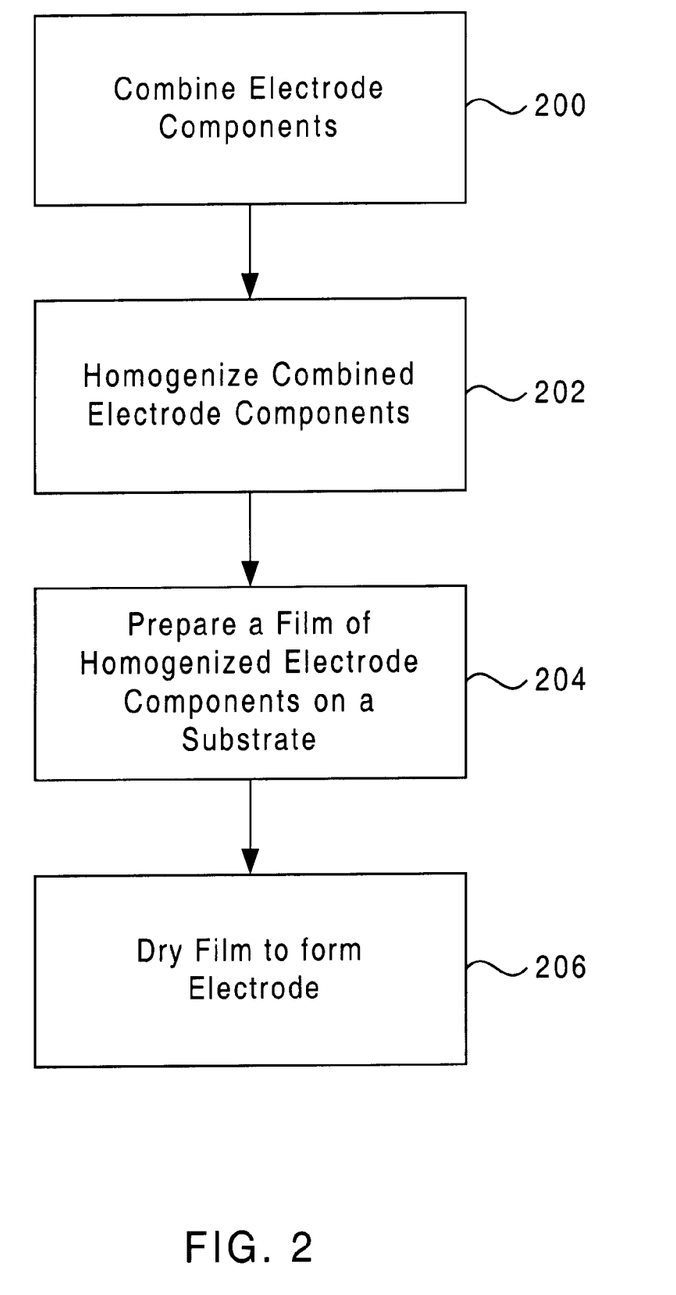
FIG. 2 provides a flow chart showing the important steps employed in preparing an electrode in accordance with the present invention.

The method illustrated in the flow chart of FIG. 2, begins with a step 200 of combining the electrode components (including the electrochemically active materials, an electronic conductor, and an ionic conductor). Next, at a step 202, the mixture is homogenized such that the electrode components are well mixed and free of agglomerates. Typically, a slurry will be formed by combining the electrode components with a liquid at either step 200 or step 202.

After the electrode components are homogenized and in slurry form, the slurry is coated on a substrate to form a thin film at a step 204. Best results will generally be obtained if the slurry is homogenized immediately before the film formation at step 204. This ensures that the slurry components have not settled or separated to any significant degree, thus providing a uniform film with the desired ratio of electrode components. Finally, at a step 206, the coated film is dried to form the electrode. The film preferably will be sufficiently thin to allow for rapid drying so that the electrode components do not significantly redistribute during drying step 206. The actual film thickness will, of course, depend upon the amount of liquid used in the slurry.

The components that are combined at step 200 include at least an electrochemically active insulator (e.g., elemental sulfur or a polydisulfide), a high discharge rate electrochemically active material, an electronically conductive material, and an ionically conductive material. Appropriate ratios of these materials are presented above for the resulting electrodes. Generally the same ratios may be employed in the mixture used to make the electrodes. The electrochemically active insulator is preferably active-sulfur, but any electrochemically active insulator or moderately conductive material may benefit from the inventive method. The high discharge rate electrochemically active material may be a metal sulfide or oxide (such as iron sulfide ($FeS_2$), titanium sulfide ($TiS_2$), molybdenum sulfide ($MoS_2$), or manganese oxide ($MnO_2$)), or a conductive polymer having . The materials should be selected so that they are readily oxidizable by active-sulfur. The ionic conductor is, as noted, preferably a polymeric ion conductor such as a polyalkylene oxide, and more preferably polyethylene oxide (PEO) or amorphous PEO. To increase the conductivity of the ion conductor, it typically will be provided with a salt containing the transported ion (e.g., a lithium salt such as lithium trifluoromethanesulfonimide or lithium perchlorate as described herein in connection with the electrolyte). The electronic conductor is preferably a carbon black or an electronically conductive polymer such as a polyaniline, polythiophene, polyacetylene, polypyrrole, etc. In an especially preferred embodiment, the electrochemically active material is active-sulfur, the ionic conductor is PEO (possibly with a small amount of an appropriate salt), and the electronic conductor is a carbon black.

In addition to the three above-mentioned "necessary" electrode components, other components that may be added to the mixture include (1) materials to catalyze the transfer of electrons from the electronically conductive material to the active material, (2) additives to protect an active metal electrode surface (e.g., lithium or sodium electrode surfaces) in cells that employ such electrodes, (3) dispersants, (4) binders, and (5) surfactants.

Materials that catalyze electron transport between the electrochemically active material and the electronic conductor are known in the art and include, for example, phthalocyanines, metallocenes, and brilliant yellow. Additives to protect an active metal electrode surface include, for example, organosulfur compounds such as poly-2,5-dimercapto-1,3,4-thiadiazole, phosphates, iodides,. iodine, metal sulfides, nitrides, and fluorides. These materials are believed to provide a protective layer on the metal electrode surface. By casting them in the active-sulfur (or other insulator) electrode, small amounts of these protective agents will diffuse across the electrolyte to react with the metal electrode and provide the protective layer. Further, a dispersant (or dispersants) such as Brij or polyethylene glycol (PEG) may also be added to the mixture. Such materials reduce a tendency to agglomerate exhibited by some of the necessary components such as carbon black. Agglomeration, of course, degrades the quality of the resulting electrode by preventing thorough mixing of the components. Other additives are widely used in fabricating positive electrodes and are known in the art to have various benefits. The use of such additives in formation of electrodes is within the scope of this invention.

As noted, the components of the electrode mixture will typically be dispersed in a slurry. Various liquids may be employed in the slurry. Typically, but not necessarily, the liquid will not dissolve active-sulfur or carbon black. It may, however, dissolve polymeric components such as PEO or a polymeric electronic conductor. Preferred liquids evaporate quickly so that the resulting film dries completely and before redistribution of the components can occur. Examples of acceptable liquids for the slurry system include water, acetonitrile, methanol, ethanol, tetrahydrofuran, etc. Mixtures of liquid compounds may also be employed. In large-scale continuous processes, it may be desirable to use a relatively low volatility liquid such as water to facilitate liquid recovery for recycling.

The relative amounts of solid and liquid in the slurry will be governed by the viscosity required for subsequent processing. For example, electrodes formed by a tape casting apparatus may require a different viscosity slurry than electrodes formed with a Mayer rod. The slurry viscosity will, of course, be governed by such factors as the composition and amounts of the slurry components, the slurry temperature, and the particle sizes in the slurry. When the mixture includes a soluble ionic conductor such as PEO, the slurry ratio is conventionally defined in terms of the amount of soluble material to liquid. Amounts of the remaining insoluble components are then pegged to the amount of soluble material. For PEO-containing electrodes, a preferred range of concentrations is between about 30 and 200 milliliters of solvent per gram of PEO.

The exact ordering in which components are added to the slurry is not critical to the invention. In one embodiment, for example, the soluble components such as PEO and Brij are first dissolved in the liquid solvent before the insoluble components are added. In another exemplary embodiment, all components except crystalline PEO are dispersed and dissolved before the crystalline PEO is added. The insoluble components may be added to the slurry sequentially or in a premixed form (i.e., the solid insolubles are mixed before addition to the slurry).

The process of homogenizing the electrode components (step 202 of FIG. 2) may take a variety of forms in accordance with the present invention. The process may vary depending upon whether electrode fabrication is performed batchwise or continuous. For small-scale batch operations, suitable slurry homogenization apparatus includes stir bars (preferably cross-type stir bars), paint mixers such as rotary blade mixers, paint shakers, and shear mixers. Further, any mixing apparatus conventionally used to make "slips" in the ceramic processing arts will be sufficient for use with this invention. By way of example, some other batch mixing systems employ ball milling, tumble mixing, shear mixing, etc. The amount of time required to obtain a suitably homogeneous mixture can be determined by routine experimentation with each of these pieces of mixing equipment.

Suitably homogeneous mixtures are evidenced by high availability of active electrode material in the resulting electrode. It has been found that with stir bars, homogenization typically requires about 2 days, whereas with paint mixers and paint shakers homogenization requires less time (on the order of a few hours). In scaling up agitators for suspending solid particles, the torque per unit volume generally should be kept constant. Even so, blending times typically are significantly longer in larger vessels than in smaller ones and this should be factored into any scale-up.

In large-scale and/or continuous electrode fabrication systems, an industrial agitator will generally be preferable. Design criteria for such systems are well known in the art and are discussed at, for example, pages 222–264 of McCabe and Smith "Unit Operations of Chemical Engineering" Third Edition, McGraw Hill Book Company, New York (1976), which reference is incorporated by reference herein for all purposes. Suitable systems include turbine agitators and axial-flow or radial-flow impellers in tanks or vessels with rounded bottoms. In general, the vessels should not have sharp corners or regions where fluid currents cannot easily penetrate. Further, the system should be designed to prevent circulatory currents which throw solid particles to the outside of the vessel where they move downward and concentrate. Circulatory currents can be mitigated by employing baffles in the system (e.g., vertical strips perpendicular to the wall of the vessel). Shrouded impellers and diffuser rings can also be used for this purpose.

Very soon after the slurry is homogenized, it is deposited as a film on a substrate (step 204 of FIG. 2). The exact amount of time between homogenization and deposition will depend upon the physical character of the slurry (viscosity, solids concentration, solids particle sizes, etc.). Significant settling and separation of the solids in the slurry is to be avoided. Settling can be slowed by employing (a) small particles of low density solids, (b) high concentrations of the solids, and/or (c) highly viscous liquids. Further, the particles of the various solid components of the slurry can be chosen so that they all settle at about the same rate, thereby avoiding the problem of segregation. To the extent possible, the slurry, should be delivered to a substrate immediately after homogenization. For example, slip conditioning and supply systems such as these provided by EPH Associates, Inc. of Orem, Utah may be used to deliver slurry from a homogenizer directly to a substrate.

Preferably the substrate on which the slurry is applied is a current collector such as a sheet of stainless steel, aluminum, copper, titanium, metallized PET, or other conductive material which will not react at operating cell conditions. Suitable current collectors may also take the form of expanded metals, screens, meshes, foams, etc. as is known in the art. In alternative embodiments, the substrate may be a sheet of inert material that does not adhere to dried electrode material. One such suitable substrate material is Teflon®. After the electrode film is dried, it is peeled away from such substrate and later contacted to a current collector such as one of the above-mentioned materials. Contacting to the current collector may be accomplished by hot pressing, crimping, etc. Alternatively, the current collector can be formed directly on the electrode material by a technique such as metal spraying, sputtering, or other technique known to those of skill in the art.

The process of forming an electrode concludes with a drying step (step 106 of FIG. 1). In batch processes, this is preferably accomplished in two steps: evaporation under ambient conditions for 30 seconds to 12 hours, followed by drying under vacuum for about 4 to 24 hours at room temperature or an elevated temperature. In continuous processes, drying may be accomplished by passing a sheet of electrode/substrate through a drying chamber such as an infra red (IR) drier. A typical resulting active-sulfur electrode layer will have a density between about 0.0016 and 0.012 grams per $cm^2$.

In alternative embodiments, the electrode is formed without first preparing a slurry. Rather the electrode components—including the electrochemically-active insulator, the ion conductor, and the electron conductor—are homogenized in a solid state and formed into a sheet as by extrusion or calendaring. The solid state homogeneous mixture may also be coated onto a substrate by roll coating, blade coating, extrusion coating, curtain coating, or a related process. In each case, the solid state mixture is caused to flow by application of heat and/or pressure and the resulting viscous or viscoelastic mixture is passed though a die, a roller, or a blade. In such embodiments, the PEO or other polymeric components should be present in concentrations suitable to allow formation of a viscous or viscoelastic material under conditions encountered in standard polymer processing apparatus. Details of suitable polymer processing techniques are found in Middleman, "FUNDAMENTALS OF POLYMER PROCESSING", McGraw-Hill, Inc. 1977 which is incorporated herein by reference in its entirety and for all purposes. In addition to these processing techniques involving flow, alternative techniques within the scope of this invention include electrostatic deposition as by processes analogous to xerography. Further, dry processes conventionally used in the rubber processing arts may be applied to form electrodes in accordance with this invention. Because each of the above "dry" techniques do not involve a slurry, no drying step is required. Thus, there is less opportunity for the solid electrode components to segregate or agglomerate after homogenization.

Further details regarding the manufacture of battery cells in accordance with the present invention, including fixed tube and continuous or batch processes, are provided in the U.S. Pat. No. 5,523,179 and the other Chu et al. patents previously noted and incorporated by reference.

Negative electrode

Most generally, the negative electrode can comprise any metal, any mixture of metals, glass, carbon or metal/carbon material capable of functioning as a negative electrode in combination with the sulfur-based composite positive electrode of this invention. Accordingly, negative electrodes comprising any of the alkali or alkaline earth metals or transition metals (the polyether electrolytes are known to transport divalent ions such as $Zn^{++}$), for example, in combination with the positive electrodes and electrolytes of this invention are within the ambit of the invention, and particularly alloys containing lithium and/or sodium.

Stated another way, the negative electrodes employed in the batteries of this invention may include a metal (in elemental or alloy form) or an ion of that metal as used in, for example, a carbon intercalation electrode or a glass matrix electrode. As explained above, metal ions from this negative electrode combine with elemental sulfur or polysulfides to produce a sulfide and polysulfides of the metal during discharge of the battery.

In one preferred embodiment, the materials for the negative electrodes include a metal such lithium or sodium or an alloy of one of these with one or more additional alkali metals and/or alkaline earth metals. Preferred alloys include lithium aluminum alloys, lithium silicon alloys, lithium tin alloys, and sodium lead alloys (e.g., $Na_4Pb$). Other metallic electrodes may include alkaline earth electrodes such as magnesium and their alloys; transition metal electrodes such as aluminum, zinc, and lead and their alloys;

The surface of such metallic negative electrodes can be modified to include a protective layer on the electrolyte side. This protective layer should be conductive to lithium ions and help prevent the formation of lithium dendrites or "mossy" lithium on repeated cycling. It can be produced by the action of additives, including organosulfur compounds, phosphates, iodides, nitrides, and fluorides. The protective layer may also be pre-formed from an inert physical barrier conductive to the metal ions from the negative electrode. Examples of such pre-formed protective layers include lithium phosphate, silicate glasses, polymers, or a combinations of these. In a particularly preferred embodiment, the protective layer is poly(1-trimethylsilyl-1-propyne) ("PTMSP"). The protected negative electrodes may not require an electrolyte separator, thereby allowing the thin film cells of this invention to be made even thinner. Such protected negative electrodes are described in more detail in U.S. patent application Ser. No. 09/086,665.

In an alternative embodiment, the negative electrode may be an intercalation electrode such as a carbon-based lithium ion electrode. Such electrodes are available in commercial lithium ion batteries available from Sony Corporation of Japan. These materials are described by Jeffrey Dahn in Chapter 1 of "Lithium Batteries, New Materials, Developments and Perspectives," edited by G. Pistoia and published by Elsevier (1994), which reference is incorporated herein by reference. Generally, such electrodes have the formula $Li_yC_6$ (where $0.3>y\leq2$). For many of these materials, the fully-charged electrode has the formula $LiC_6$. The intercalation electrode matrix may include graphite, petroleum coke, carbon inserted within highly disordered carbons, etc. The inserted carbon may also be doped with boron, phosphorus, or other appropriate dopant. In one example, the carbon may be prepared from low temperature pyrolysis (about 750° C.) of carbon or carbon-silicon containing polymers such that the carbon product retains some hydrogen or silicon or both. (See, Sato et al., "A Mechanism of Lithium Storage in Disordered Carbons," Science, 264: 556 (Apr. 22, 1994), which discusses very good results with a preferred negative electrode of Li inserted within poly p-phenylene-based carbon).

Glass matrix negative electrodes such as $Li/Sn_2O_3$ and $Li/SiO_2$ may also be employed in the batteries of the present invention. These electrodes are similar to the above-described carbon-based intercalation electrodes in that lithium ions are inserted therein during charge and removed during discharge. Such glass matrix electrodes are described in various references including Tahara et al., European Patent Application No. 93111938.2 (1993), Idota et al. Canadian Patent Application, 21134053 (1994), and I. Courtney et al. Meeting Abstracts of the Electrochemical Society, Fall Meeting, San Antonio, Tex., Oct. 6–11, 1996 Vol. 96–2, Abstract # 66, page 88, each of which is incorporated herein by reference for all purposes.

Battery Cells

The present invention provides battery cells containing the high capacity (active-sulfur)/high discharge rate material composite positive electrodes in accordance with the present invention. Suitable batteries may be constructed according to the known art for assembling cell components and cells as desired, and any of the known configurations may be fabricated utilizing the invention. The exact structures will depend primarily upon the intended use of the battery unit. Examples include thin film with porous separator, thin film polymeric laminate, jelly roll (i.e., spirally wound), prismatic, coin cell, etc.

Battery cells containing the active-sulfur-based composite positive electrodes, of this invention can be constructed according to conventional formats as described in the literature. For example, De Jonghe et al., U.S. Pat. No. 4,833,048 and Visco et al., U.S. Pat. No. 5,162,175. Such conventional formats are incorporated herein by reference.

Figure 3:
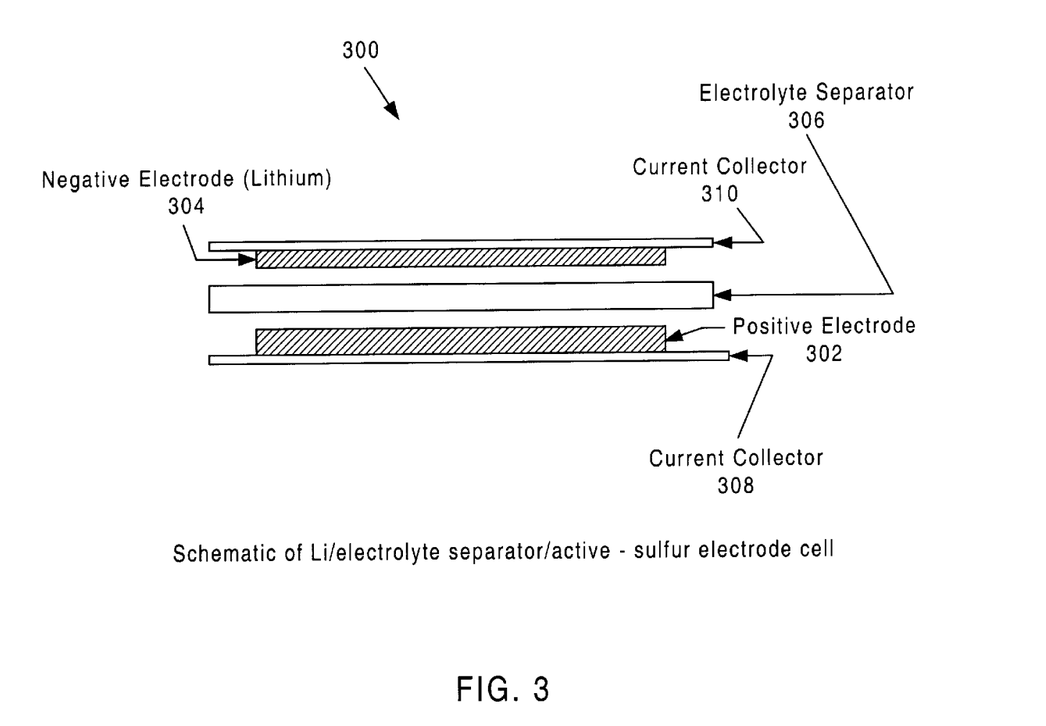
FIG. 3 provides a schematic of an active-sulfur and high discharge rate material positive electrode battery cell in accordance with a preferred embodiment of the present invention.

FIG. 3 illustrates a schematic of a battery cell 300 in accordance with the present invention. The battery includes active-sulfur and high discharge rate material positive electrode 302 spaced from a negative electrode 304, preferably of lithium, and both electrodes may be in material contact with an electrolyte separator 306. Current collectors 308 and 310 contact both the positive 302 and negative 304 electrodes, respectively, in a conventional manner and permit an electrical current to be drawn by an external circuit. In a typical cell, all of the components will be enclosed in an appropriate casing (not shown), for example, plastic, with only the current collectors 308 and 310 extending beyond the casing. Thereby, reactive elements, such as sodium or lithium in the negative electrode, as well as other cell elements are protected.

Other conventional cell designs are well known in the art. Examples of sulfur cells employing non-thin film design are set forth in the following references which are incorporated herein by reference for all purposes: (1) R. D. Rauh, F. S. Shuker, J. M. Marston and S. B. Brummer, J. Inorg. Nuc. Chem., "Formation of Lithium Polysulfides in Aprotic Media", 39, 1761 (1977); (2) R. D. Rauh, K. M. Abraham, G. F. Pearson, J. K. Suprenant and S. B. Brummer, "A Lithium/Dissolved Sulfur Battery with an Organic Electrolyte," J. Electrochem. Soc., 126, 523 (1979); (3) H. Yamin, A. Gorenshtein, J. Penciner, Y. Sterberg, and E. Peled, "Lithium Sulfur Battery," J. Electrochem. Soc., 135, 1045 (1988); (4) H. Yamin and E. Peled, "Electrochemistry of a Nonaqueous Lithium/Sulfur Cell," J. Power Sources, 9, 281 (1983); and (5) E. Peled, Y. Sterberg, A. Gorenshtein, and Y. Lavi, "Lithium-Sulfur Battery: Evaluation of Dioxolane-Based Electrolyte," J. Electrochem. Soc., 136, 1621 (1989).

If the battery cell employs a solid- or gel-state electrolyte, the positive electrode should include an electronic conductor (e.g., carbon) and an ionic conductor (e.g., polyethylene oxide) in addition to the electroactive materials. If the battery employs a liquid electrolyte, the positive electrode requires only an electronic conductor in addition to the electroactive materials. The electrolyte itself permeates the electrode and acts as the ionic conductor. In the case of a liquid electrolyte cell, the battery design may assume two formats: (1) all electroactive material is dissolved in electrolyte solution (one phase positive electrode) and (2) the electroactive material is distributed between a solid phase (sometimes precipitated) and a liquid phase.

When the battery cells of this invention include a liquid electrolyte, that electrolyte should keep sulfur discharge products in solution and therefore available for electrochemical reaction. Thus, they preferably solubilize lithium sulfide and relatively low molecular weight polysulfides. In a particularly preferred embodiment, the electrolyte solvent has repeating ethoxy units ($CH_2CH_2O$). This may be a glyme or related compound. Such solvents are believed to strongly coordinate lithium and thereby increase the solubility of discharge products of lithium-sulfur batteries. Suitable liquid electrolyte solvents are described in more detail in U.S. patent application Ser. No. 08/948,969, which is incorporated herein by reference for all purposes.

It should be understood that the electrolyte solvents of this invention may also include cosolvents. Examples of such additional cosolvents include sulfolane, dimethyl sulfone, dialkyl carbonates, tetrahydrofuran (THF), dioxolane, propylene carbonate (PC), ethylene carbonate (EC), dimethyl carbonate (DMC), butyrolactone, N-methylpyrrolidinone, dimetboxyethane (DME or glyme), hexamethylphosphoramide, pyridine, N,N-diethylacetamide, N,N-diethylformamide, dimethylsulfoxide, tetramethylurea, N,N- dimethylacetamide, N,N-dimethylformamide, tributylphosphate, trimethylphosphate, N,N,N',N'-tetraethylsulfamide, tetraethylenediamine, tetramethylpropylenediamine, pentamethyldiethylenetriamine, methanol, ethylene glycol, polyethylene glycol, nitromethane, trifluoroacetic acid, trifluoromethanesulfonic acid, sulfur dioxide, boron trifluoride, and combinations of such liquids.

Exemplary but optional electrolyte salts for the battery cells incorporating the electrolyte solvents of this invention include, for example, lithium trifluorometbanesulfonimide ($LiN(CF_3SO_2)_2$), lithium triflate ($LiCF_3SO_3$), lithium perchlorate ($LiClO_4$), $LiPF_6$, $LiBF_4$, $LiAsF_6$, as well as corresponding salts depending on the choice of metal for the negative electrode, for example, the corresponding sodium salts. As indicated above, the electrolyte salt is optional for the battery cells of this invention, in that upon discharge of the battery, the metal sulfides or polysulfides formed can act as electrolyte salts, for example, $M_{x/z}S$ wherein x=0 to 2 and z is the valence of the metal.

As mentioned, the battery cells of this invention may include a solid-state electrolyte. An exemplary solid-state electrolyte separator is a ceramic or glass electrolyte separator which contains essentially no liquid. Specific examples of solid-state ceramic electrolyte separators include beta alumina-type materials such as sodium beta alumina, Nasicon™ or Lisicon™ glass or ceramic. Polymeric electrolytes, porous membranes, or combinations thereof are exemplary of a type of electrolyte separator to which an aprotic organic plasticizer liquid can be added according to this invention for the formation of a solid-state electrolyte separator containing less than 20% liquid. Suitable polymeric electrolyte include polyethers, polyimines, polythioethers, polyphosphazenes, polymer blends, and the like and mixtures and copolymers thereof in which an appropriate electrolyte salt has optionally been added. Preferred polyethers are polyalkylene oxides, more preferably, polyethylene oxide.

In the gel-state, the electrolyte separator contains at least 20% (weight percentage) of an organic liquid (see the above listed liquid electrolytes for examples), with the liquid being immobilized by the inclusion of a gelling agent. Many gelling agents such as polyacrylonitrile, PVDF, or PEO can be used.

It should be understood that some systems employing liquid electrolytes are commonly referred to as having "polymer" separator membranes. Such systems are considered liquid electrolyte systems within the context of this invention. The membrane separators employed in these systems actually serve to hold liquid electrolyte in small pores by capillary action. Essentially, a porous or microporous network provides a region for entraining liquid electrolyte. As mentioned above, such separators are described in U.S. Pat. No. 3,351,495 assigned to W. R. Grace & Co. and U.S. Pat. Nos. 5,460,904, 5,540,741, and 5,607, 485 all assigned to Bellcore, for example.

The separator may occupy all or some part of the electrolyte compartment of the battery cell. Preferably, it will be a highly porous/permeable material such as a felt, paper, or microporous plastic film. It should also resist attack by the electrolyte and other cell components under the potentials experienced within the cell. Examples of suitable separators include glass, plastic, ceramic, and porous membranes thereof among other separators known to those in the art. In one specific embodiment, the separator is Celgard 2300 or Celgard 2400 available from Hoechst Celanese of Dallas, Tex.

The separator may also be of the type sometimes referred to as a "polymer" separator membrane having a porous or microporous network for entraining liquid electrolyte. Such separators are described in U.S. Pat. No. 3,351,495 assigned to W. R. Grace & Co. and U.S. Pat. Nos. 5,460,904, 5,540,741, and 5,607,485 all assigned to Bellcore, for example. These patents are incorporated herein by reference for all purposes.

In some embodiments of the invention, the cell may be characterized as a "thin film" or "thin layer" cell. Such cells possess relatively thin electrodes and electrolyte separators. Preferably, the positive electrode is no thicker than about 300 μm, more preferably no thicker than about 150 μm, and most preferably no thicker than about 100 μm. The negative electrode preferably is no thicker than about 200 μm and more preferably no thicker than about 100 μm. Finally, the electrolyte separator (when in a fully assembled cell) is no thicker than about 100 μm and more preferably no thicker than about 40 μm.

It will be desirable to provide the cells of this invention in a thin film format. This has several advantages. First, such cells may be stacked together to form a battery. In this configuration, the battery electrodes possess a relatively high surface area per unit mass of electrode. Thus, the local current density in the battery is kept relatively low, thereby holding the cell reactions relatively close to equilibrium. This has the benefit of maintaining a relatively uniform current density over the electrode surfaces. Cells with highly non-uniform current densities typically have short life spans because the regions of high current density consume (and generate) greater quantities of cell reactants. As a consequence, reaction products (e.g., plated lithium and lithium sulfide) build up faster at regions of high current density. This can create undesirable mossy lithium deposits and precipitation of sulfides and polysulfides. The uneven distribution of electrode materials (including precipitates) grows with continued cycling until the cell is destroyed.

As a further advantage, the thin film configuration provides a steep concentration gradient for a small concentration difference because of the relatively small separation between the electrodes. This then supports a greater mass flux of discharge products and allows the cell to operate at higher current densities. Insufficient mass flux in the vicinity of the positive electrode may cause the local sulfide and/or polysulfide concentration to build to a level exceeding the solubility limit, at which point detrimental precipitation can occur.

Thin film cells in accordance with the present invention may be formed in accordance with the principles and procedures described in U.S. patent application Ser. No. 08/948,969, which is incorporated herein by reference for all purposes, with the addition of the high discharge rate material to the positive electrode slurry.

Operating Temperatures

As with other active-sulfur batteries described by Chu et al. as cited above, the operating temperature of the battery cells incorporating the novel positive electrode of this invention is preferably 180° C. or below. Preferred operating temperature ranges depend upon the application. Exemplary preferred operating temperature ranges include from −40° C. to 145° C.; from −20° C. to 145° C.; from −20° C. to 120° C.; and from 0° C. to 90° C. Most preferably for many applications, the cells incorporating this invention operate at ambient or above-ambient temperatures.

Different embodiments of this invention can provide different preferred operating temperature ranges. The choice of electrolyte can influence the preferred operating temperature ranges for the batteries incorporating the positive electrode of this invention. For example, when conventional PEO is used the preferred operating range is 60° C. to 120° C.; whereas when amorphous PEO (aPEO) is used, the battery can be run at room temperature, or in a range of 0° C. to 60° C.

Gel formats also provide for lower operating temperature ranges. Exemplary battery cells using the positive electrode of this invention containing, for example, polymeric electrolyte separators with increasingly greater percentages of an aprotic organic liquid immobilized by the presence of a gelling agent, can provide for increasingly lower operating temperature ranges. An exemplary operating temperature range for a solid-state battery having gel-state components of this invention would be from about −20° C. to about 60° C.

A battery with a liquid separator and a negative electrode comprising carbon, inserted carbon and/or a mixture of carbon with lithium or sodium can operate at a preferred temperature range of from −40° C. to 60° C.

The high temperature operating range of the battery cells based on the positive electrode of this invention can be limited by the melting point of either a solid electrode or a solid electrolyte. Thus sodium negative electrodes are limited to temperatures below 97.8° C., but sodium alloy electrodes, such as $Na_4Pb$, can be used in a solid form at well over 100° C.

Specific Energy and Specific Power

Again, as with other active-sulfur batteries described by Chu et al. as cited above, the practical specific energies of the secondary cells utilizing this invention are preferably greater than 65 watt-hours per kilogram (Wh/kg), more preferably greater than 100 Wh/kg, still more preferably greater than 150 Wh/kg, even more preferably greater than 200 Wh/kg, and still even more preferably greater than 250 Wh/kg. While cells having specific energies in the above ranges are preferred for many applications, these ranges should not be viewed as limiting the invention. In fact, the cells of this invention can be expected to achieve specific energies in excess of 850Wh/kg. Thus, for some applications, a preferred practical specific energy range of the batteries incorporating this invention is from about 100 Wh/kg to about 800 Wh/kg. The supplementation of active-sulfur in the positive electrode with a second electrochemically active material which is also electrically conductive, such as $FeS_2$, should further increase specific energies by replacing conventionally used electrical conductors with no capacity, such as carbon.

The practical steady-state specific power of the secondary cells utilizing this invention is preferably greater than 20 watts per kilogram (W/kg), more preferably greater than 50 W/kg, still more preferably greater than 100 W/kg, even more preferably greater than 150 W/kg, and still even more preferably greater than 250 W/kg. It is envisioned that with battery construction optimized for power, the steady-state power of this invention can exceed 750 W/kg. A preferred practical specific energy range of the batteries incorporating this invention is from about 50 W/kg to about 500 W/kg. The peak and pulse power performances would be many times greater than the steady-state power.

Conclusion

Although the foregoing invention has been described in some detail for purposes of clarity of understanding, it will be apparent that certain changes and modifications may be practiced within the scope of the appended claims. For example, the invention may also provide overcharge protection as described in U.S. Pat. No. 5,686,201 and entitled RECHARGEABLE POSITIVE ELECTRODES and U.S. patent application Ser. No. 08/782,245, filed Mar. 19, 1997, and entitled OVERCHARGE PROTECTION SYSTEMS FOR RECHARGEABLE BATTERIES. Accordingly, the present embodiments are to be considered as illustrative and not restrictive, and the invention is not to be limited to the details given herein, but may be modified within the scope and equivalents of the appended claims.

What is claimed is:

1. A positive electrode comprising:

a) a first electrochemically active material selected from the group consisting of elemental sulfur, a metal sulfide, a metal polysulfide, and combinations thereof, wherein said metal is selected from the group consisting of alkali metals, alkaline earth metals, and mixtures of alkali and alkaline earth metals; and b) a second electrochemically active material having a higher discharge rate than said first material, and having a discharge material that is oxidizable by in situ redox reaction with the first electrochemically active material, said discharge material selected from the group consisting of metal sulfides, metal oxides, and conductive polymers.

2. The positive electrode of claim 1, further comprising:

c) an electronically conductive material mixed with the electrochemically active materials so that electrons move between the electrochemically active materials and the electronically conductive material.

3. The positive electrode of claim 2, further comprising:

d) an ionically conductive material mixed with the electrochemically active materials so that ions move between the ionically conductive material and the electrochemically active material.

4. The positive electrode of claim 1, wherein said first electrochemically active material comprises a lithium polysulfide.

5. The positive electrode of claim 1, wherein said second electrochemically active material comprises $FeS_2$.

6. The positive electrode of claim 1, wherein said second electrochemically active material comprises $TiS_2$.

7. The positive electrode of claim 2, wherein said electronically conductive material is carbon black.

8. The positive electrode of claim 3, wherein said ionically conductive material is a liquid, gel or solid.

9. The positive electrode of claim 1, wherein said positive electrode comprises from about 20% to 95% (by weight) of said first electrochemically active material, and from about 5% to 80% of said second electrochemically active material.

10. The positive electrode of claim 1, wherein said positive electrode comprises from about 30% to 90% (by weight) of said first electrochemically active material, and from about 10% to 70% of said second electrochemically active material.

11. The positive electrode of claim 1, wherein said positive electrode comprises from about 40% to 80% (by weight) of said first electrochemically active material, and from about 20% to 60% of said second electrochemically active material.

12. The positive electrode of claim 2, wherein said positive electrode comprises from about 0% to 40% (by weight) of the electronically conductive material.

13. The positive electrode of claim 3, wherein said positive electrode comprises from about 5% to 70% (by weight) of the ionically conductive material.

14. A battery cell comprising:
a) a positive electrode comprising a mixture of
   i) a first electrochemically active material selected from the group consisting of elemental sulfur, a metal sulfide, a metal polysulfide, and combinations thereof, wherein said metal is selected from the group consisting of alkali metals, alkaline earth metals, and mixtures of alkali and alkaline earth metal, and
   ii) a second electrochemically active material having a higher discharge rate than said first material, and having a discharge material that is oxidizable by in situ redox reaction with the first electrochemically active material, said discharge material selected from the group consisting of metal sulfides, metal oxides, and conductive polymers,
b) a current collector electrically connected to the positive electrode;
c) a negative electrode including a metal or metal ion; and
d) an electrolyte separator.

15. The battery cell of claim 14, further comprising:
e) an electronically conductive material mixed with the electrochemically active materials so that electrons move between the electrochemically active materials and the electronically conductive material.

16. The battery cell of claim 14, further comprising:
f) an ionically conductive material mixed with the electrochemically active materials so that ions move between the ionically conductive material and the electrochemically active material.

17. The battery cell of claim 14, wherein said first electrochemically active material is a lithium polysulfide.

18. The battery cell of claim 14, wherein said second electrochemically active material is $FeS_2$.

19. The battery cell of claim 14, wherein said second electrochemically active material is $TiS_2$.

20. The battery cell of claim 15, wherein said electronically conductive material is carbon black.

21. The battery cell of claim 16, wherein said ionically conductive material is a liquid, gel or solid.

22. The battery cell of claim 14, wherein said positive electrode comprises from about 20% to 95% (by weight) of said first electrochemically active material, and from about 5% to 80% of said second electrochemically active material.

23. The battery cell of claim 14, wherein said positive electrode comprises from about 20% to 95% (by weight) of said first electrochemically active material, and from about 5% to 80% of said second electrochemically active material.

24. The battery cell of claim 14, wherein said positive electrode comprises from about 30% to 90% (by weight) of said first electrochemically active material, and from about 10% to 70% of said second electrochemically active material.

25. The battery cell of claim 14, wherein said positive electrode comprises from about 40% to 80% (by weight) of said first electrochemically active material, and from about 20% to 60% of said second electrochemically active material.

26. The battery cell of claim 15, wherein said positive electrode comprises from about 0% to 40% (by weight) of the electronically conductive material.

27. The battery cell of claim 16, wherein said positive electrode comprises from about 5% to 70% (by weight) of the ionically conductive material.

28. The battery cell of claim 14, wherein said electrolyte separator is a liquid, gel or solid.

29. The battery cell of claim 14, wherein said battery cell has a thin film format.

* * * * *